(12) United States Patent
Wells

(10) Patent No.: US 9,544,270 B2
(45) Date of Patent: Jan. 10, 2017

(54) UNIVERSAL DHCP HELPERS

(71) Applicant: THE BOEING COMPANY, Chicago, IL (US)

(72) Inventor: Rudy Charles Wells, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 169 days.

(21) Appl. No.: 14/504,190

(22) Filed: Oct. 1, 2014

(65) Prior Publication Data

US 2016/0099911 A1     Apr. 7, 2016

(51) Int. Cl.
G06F 15/173     (2006.01)
G06F 15/16      (2006.01)
H04L 29/12      (2006.01)

(52) U.S. Cl.
CPC ................ *H04L 61/2015* (2013.01)

(58) Field of Classification Search
CPC .................................................. H04L 61/2015
USPC ....................................................... 709/226
See application file for complete search history.

(56) References Cited

U.S. PATENT DOCUMENTS

| 7,711,826 | B2* | 5/2010 | Ford | H04L 69/40 370/341 |
| 8,089,967 | B2* | 1/2012 | Hazard | H04L 45/02 370/395.3 |
| 8,250,189 | B1* | 8/2012 | Breau | H04L 61/103 709/222 |
| 8,484,322 | B2* | 7/2013 | Ogawa | H04L 29/12207 370/352 |
| 8,782,183 | B2* | 7/2014 | Squire | H04L 41/084 709/218 |
| 8,856,384 | B2* | 10/2014 | Jiang | H04L 61/2528 709/202 |
| 8,862,735 | B1* | 10/2014 | Singh | H04L 63/20 709/221 |
| 8,880,703 | B2* | 11/2014 | Leng | H04L 61/2007 709/223 |
| 8,891,358 | B2* | 11/2014 | Sampath | H04L 45/00 370/216 |

(Continued)

OTHER PUBLICATIONS

Author Unknown, "IP Multicast Technology Overview," DIG: Enterprise Campus Technology, pp. 3-26, http://www.cisco.com/c/en/us/td/docs/ios/solutions_docs/ip_multicast/White_papers/mcst_ovr.pdf, retrived from the Internet on Oct. 1, 2014.

*Primary Examiner* — Melvin H Pollack
(74) *Attorney, Agent, or Firm* — MH2 Technology Law Group LLP

(57) ABSTRACT

The present disclosure generally relates to techniques for providing an Internet protocol (IP) address to a client device communicatively coupled to a network. The technique can include: sending, by the client and over the network, a request for an IP address; receiving, by a router, the request; forwarding, by the router, the request to a universal helper server; receiving, by the universal helper server, the request; determining, by the universal helper server, an IP address of a DHCP server; forwarding, by the universal helper server, the request to the DHCP server; providing to the router, by the DHCP server, a client IP address; and sending, from the router to the client, the client IP address, such that the client is configured with the client IP address such that the client can receive point to point messages.

16 Claims, 3 Drawing Sheets

(56) References Cited

U.S. PATENT DOCUMENTS

| | | | | |
|---|---|---|---|---|
| 8,909,726 B1* | 12/2014 | Eckert | ............... | H04L 61/00 |
| | | | | 709/207 |
| 8,988,985 B2* | 3/2015 | Kini | ............... | H04L 61/2061 |
| | | | | 370/219 |
| 9,087,319 B2* | 7/2015 | Nguyen | ............... | G06Q 10/10 |
| 9,118,687 B2* | 8/2015 | Murphy | ............... | H04L 61/103 |
| 9,300,541 B2* | 3/2016 | Danforth | ............... | H04L 41/12 |
| 9,300,627 B2* | 3/2016 | Danforth | ............... | H04L 67/327 |
| 2014/0280809 A1* | 9/2014 | Li | ............... | H04L 41/0806 |
| | | | | 709/222 |
| 2014/0325040 A1* | 10/2014 | Moore | ............... | H04L 41/0672 |
| | | | | 709/221 |
| 2015/0081926 A1* | 3/2015 | White | ............... | H04L 67/1008 |
| | | | | 709/245 |
| 2015/0113168 A1* | 4/2015 | Xu | ............... | H04N 21/44227 |
| | | | | 709/245 |
| 2015/0163100 A1* | 6/2015 | Graf | ............... | H04L 41/12 |
| | | | | 370/255 |
| 2015/0180717 A1* | 6/2015 | Cui | ............... | H04L 41/0663 |
| | | | | 370/254 |
| 2015/0257081 A1* | 9/2015 | Ramanujan | ............... | H04L 45/24 |
| | | | | 370/329 |
| 2015/0271017 A1* | 9/2015 | Seligson | ............... | H04L 41/0813 |
| | | | | 370/254 |
| 2015/0288733 A1* | 10/2015 | Mao | ............... | H04L 65/4076 |
| | | | | 709/219 |

\* cited by examiner

UNIVERSAL DHCP HELPERS

FIELD

This disclosure relates generally to providing dynamic host configuration protocol (DHCP) services.

BACKGROUND

DHCP servers provide network parameters to client computing devices. In particular, DHCP servers provide IP addresses to, and renew IP leases for, client computers and other computing devices.

Initially, a DHCP client does not have a working IP address with which to communicate with a DROP server in a point-to-point manner. Accordingly, DHCP permits the DHCP IP discovery and binding process to be performed using a broadcast address. The broadcast message is local and not visible on any other network.

If a DHCP server does not reside on the same network as the client, a local network router typically relays the broadcast traffic to a supporting DHCP server. Such a router is configured to store one or more IP address values of supporting DHCP servers. These address values are usually configured by a network administrator, who may obtain address values to use from DHCP administration. Notably, each router might have a different set of DHCP servers for which it stores IP addresses.

Router configurations can be long and complex, and configuring routers can introduce human errors. For example, human errors can be present in one of two IP address values of the DROP servers supported by a router. As long as there is a DHCP response, the incorrect redundant IP address in the address value pair can be missed. Only when the primary DHCP server is down for any reason is it discovered that a network has no redundancy of DHCP service.

SUMMARY

According to an implementation, a method for providing an internet protocol (IP) address to a client device communicatively coupled to a network is presented. The method includes sending, by the client and over the network, a request for an IP address; receiving, by a router, the request; forwarding, by the router, the request to a universal helper server; receiving, by the universal helper server, the request; determining, by the universal helper server, an IP address of a DHCP server; forwarding, by the universal helper server, the request to the DHCP server; providing to the router, by the DHCP server, a client IP address; and sending, from the router to the client, the client IP address, whereby the client is configured with the client IP address such that the client can receive point to point messages.

Various optional features of the above implementation includes the following. The determining may be based on an IP address of the router. The universal helper server may be configured to pull a plurality of IP addresses of DHCP servers from a table in a database. The universal helper server may be configured to periodically pull a plurality of IP addresses of DHCP servers from a table in the database. The router may be configured with an IP address of universal helper server. The router may not be configured with an IP address of a DHCP server. The sending, by the client, the request may include broadcasting the request. The sending, from the router to the client, the client IP address may include broadcasting the IP address. The forwarding, by the router, the request to a universal helper server may include sending using an Anycast technique. The universal helper server may be one of a plurality of universal helper servers sharing an Anycast IP address.

According to an implementation, a system for providing an internet protocol (IP) address to a client device communicatively coupled to a network is presented. The system includes at least one universal helper server communicatively coupled to the network; and at least one router communicatively coupled to the network; where the router is configured to receive a client request for a client IP address over the network and forward the request to the universal helper server; where the universal helper server is configured to receive the request, determine an IP address of a DHCP server, and forward the request to the DHCP server; where the router is further configured to receive the client IP address from the DHCP server and send the client IP address to the client, whereby the client is configured with the client IP address such that the client can receive point to point messages.

Various optional features of the above implementation include the following. The universal helper server may be configured to determine an IP address of a DHCP server based on an IP address of the router. The system may include a database, where the universal helper server nay be further configured to pull a plurality of IP addresses of DHCP servers from a table in the database. The universal helper server may be further configured to periodically pull a plurality of (P addresses of DHCP servers from a table in the database. The router may be configured to store an IP address of universal helper server. The router may not be configured with an IP address of a DHCP server. The client may be further configured to receive a client request for an IP address broadcast over the network. The router may be further configured to send the client IP address to the client by broadcast. The router may be further configured to forward the request to the universal helper server using an Anycast technique. The universal helper server may be one of a plurality of universal helper servers sharing an Anycast IP address.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Embodiments as described herein have several advantages over the prior art. Some embodiments provide a single point of failure with respect to distributing DHCP server addresses to devices capable of handling DHCP requests. Such embodiments may use a central database to store a master list of DHCP server IP addresses. Further, such embodiments are superior to prior art systems that require administrators to manually configure multiple individual routers. These and other embodiments are described herein in detail.

Figure 1:
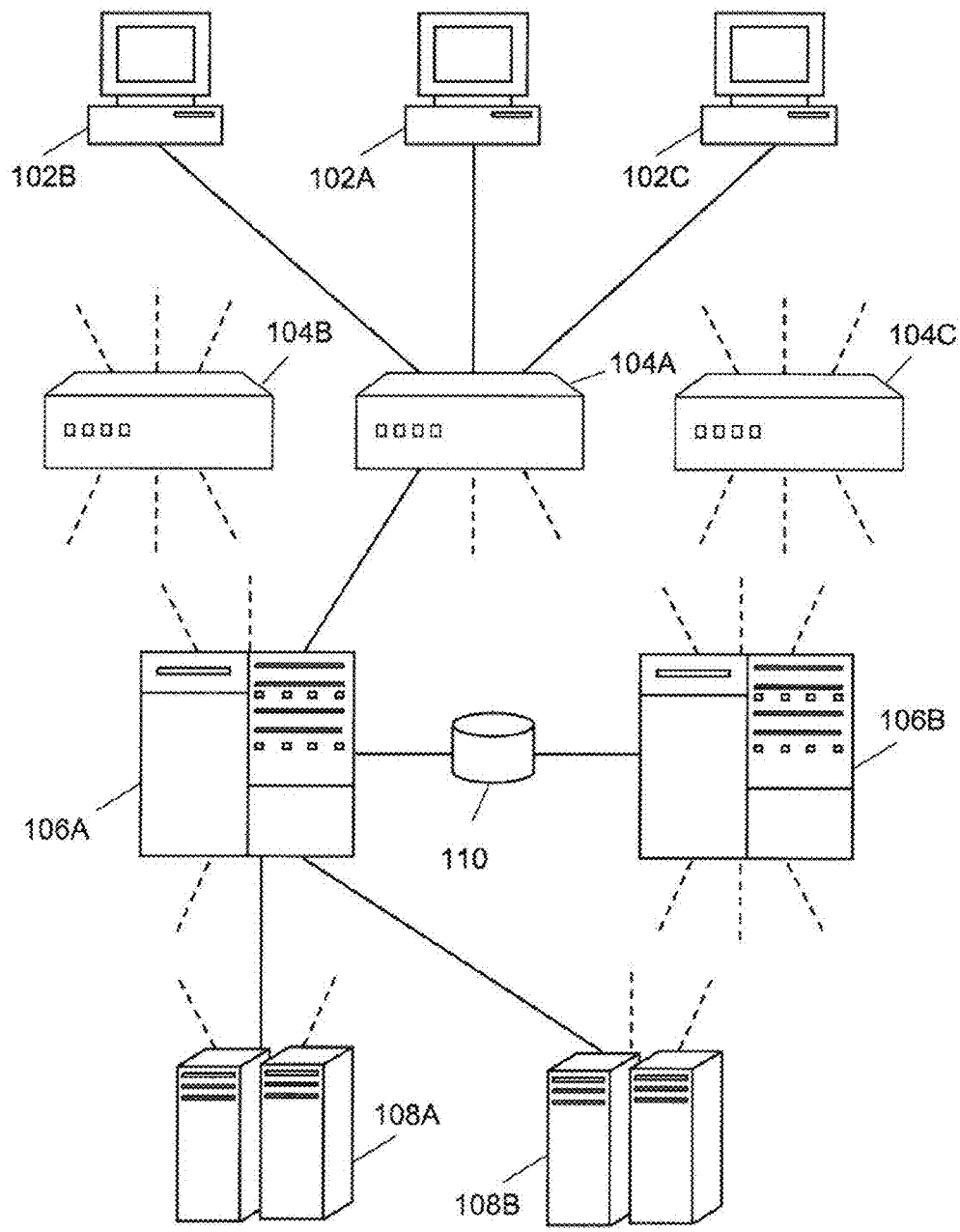
FIG. 1 is a schematic diagram of an enterprise hardware and software computer system according to some embodiments.

FIG. 1 is a schematic diagram of an enterprise hardware and software computer system according to some embodiments. The enterprise as depicted in FIG. 1 includes at least client computers 102A, 102B, 102C, routers 104A 1048, 104C, and universal helper servers 106A, 106B. Client computers 102A, 102B, 102C are communicatively coupled to at least one router, as depicted in FIG. 1, router 104A. (As used herein, the phrase "communicatively coupled" means coupled through one or more electronic networks such that electronic network communication between the coupled devices is possible.) Routers 104A, 104B 104C may be communicatively coupled to other client computers and/or network resources, as shown in FIG. 1 using dotted lines.

Routers 104A, 104B, 104C are communicatively coupled to one or more universal helper servers 106A, 106B. Universal helper servers 106A, 106B are additionally coupled to other routers and/or network resources, as depicted in FIG. 1 using dotted lines. Universal helper servers 106A, 106B are communicatively coupled to electronic central database 110. Respective universal helper servers 106A, 106B are communicatively coupled to one or more DHCP servers 108A, 108B. As depicted in FIG. 1, each DHCP server 108A, 108B may include a DHCP server pair for redundancy. In general, each universal helper server 106A, 106B is configured to redirect DHCP broadcast traffic to a designated DHCP server pair, e.g., 108A, 108B.

Each router 104A, 104B, 104C stores in its respective persistent memory one or more IP addresses of universal helper servers, e.g., 106A, 106B.

In some embodiments, each universal helper server 106A, 106B stores in its respective persistent memory one or more IP addresses of DHCP servers, e.g., 108A, 108B. In some embodiments, one or more universal helper servers are configured to pull such IP addresses from an electronic central database. As depicted in FIG. 1, universal helper server 106A is configured to pull one or more IP addresses of DHCP servers from electronic central database 110. The configuration may include that the pull is periodic, e.g., daily or hourly.

In some embodiments, each universal helper server 106A, 106B shares an Anycast IP address. Anycast is a technique for routing messages to a nearest resource. Example Anycast implementation details are known to those of skill in the art and described in, e.g., RFC 4786. Such embodiments provide load leveling and service redundancy, among other advantages. In embodiments that use Anycast as described, the plurality of universal helper servers that share the same Anycast IP address may be collectively considered to implement a universal helper service that includes multiple servers.

Figure 2:
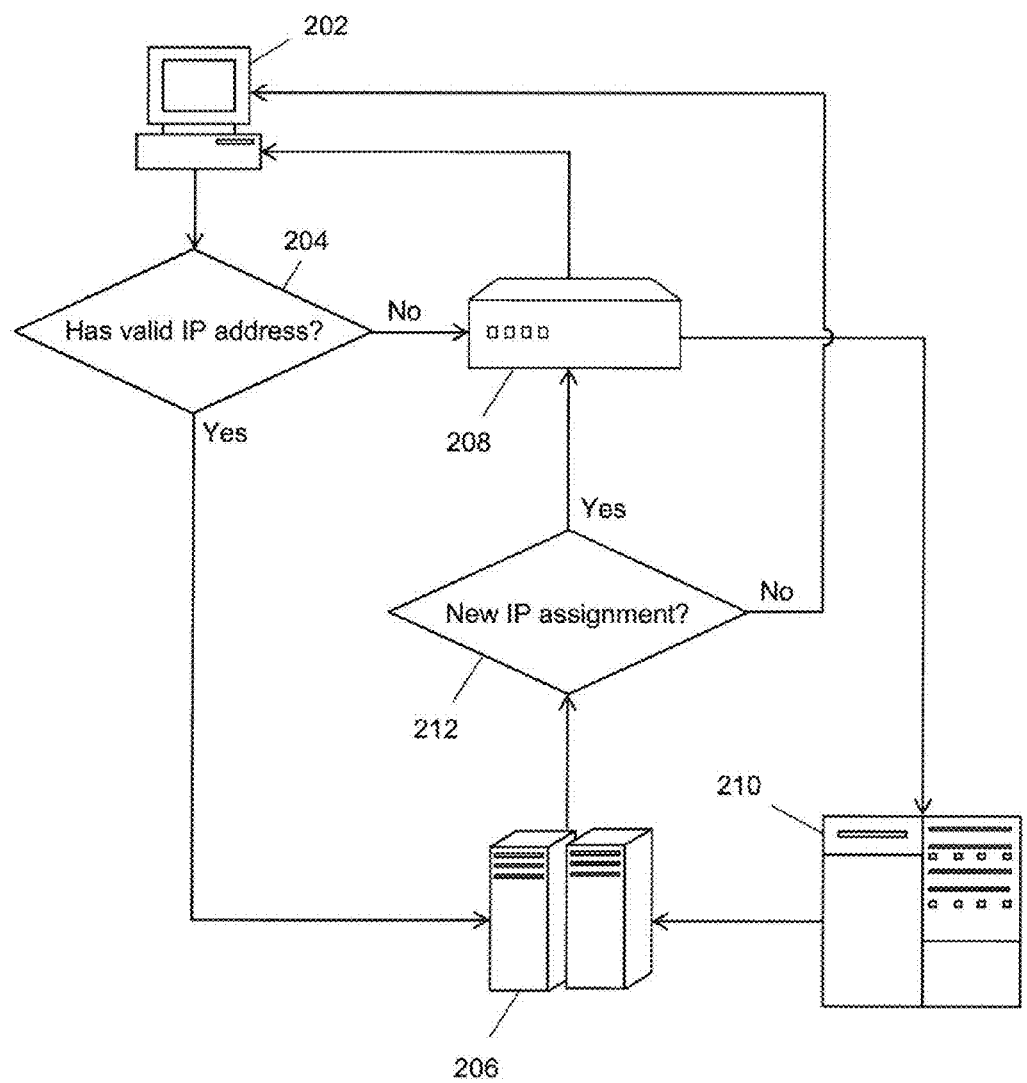
FIG. 2 is a hybrid diagram depicting a system and method according to some embodiments.

FIG. 2 is a hybrid diagram depicting a system and method according to some embodiments. That is, FIG. 2 is a hybrid topological/flow diagram according to some embodiments. The embodiments illustrated in reference to FIG. 2 may be implemented on a system such as that depicted in FIG. 1. Further, the embodiments illustrated in reference to FIG. 2 may be used to practice the methods depicted in reference to FIG. 3.

A shown in FIG. 2, client computer 202 determines 204 whether it has a valid IP address. If so, it can renew its lease by sending a lease renewal request point-to-point to DHCP server 206. (DHCP server 206 can include a pair of DHCP servers, for example.) DHCP server 206 receives the lease renewal request, determines 212 that it is not for a new IP address, and replies to client computer 202 with the lease renewal.

Otherwise, if client computer 202 does not have a valid IP address, it sends out a DHCP service request broadcast message, e.g., via port 67. The broadcast DHCP service request is received by local router 208. Local router 208 directs the request as a Unicast message to universal helper server 210. In embodiments that utilize Anycast, Anycast techniques route the request to the closest universal helper server, e.g., universal helper server 210.

Universal helper server 210 stores in its persistent memory a table of network to DHCP server pairs and locates the correct DHCP server pair (e.g., 206) based on the IP address (e.g., Gateway IP Address, or "GIADDR") of the router from which the request originated. The universal helper server 210 then transmits the request to DHCP server 206.

DHCP server 206 determines 212 that the request is for a new IP address assignment, and DHCP server 206 services the request and replies back to the router from which the request originated, in this example, router 208. Router 208 then broadcasts the DHCP reply to the local network, including client computer 202.

Client computer 202 receives the reply and implements the new IP address, as well as any other network parameters included in the reply. Client computer 202 is configured with an IP address such that it can participate in point-to-point communications.

Figure 3:
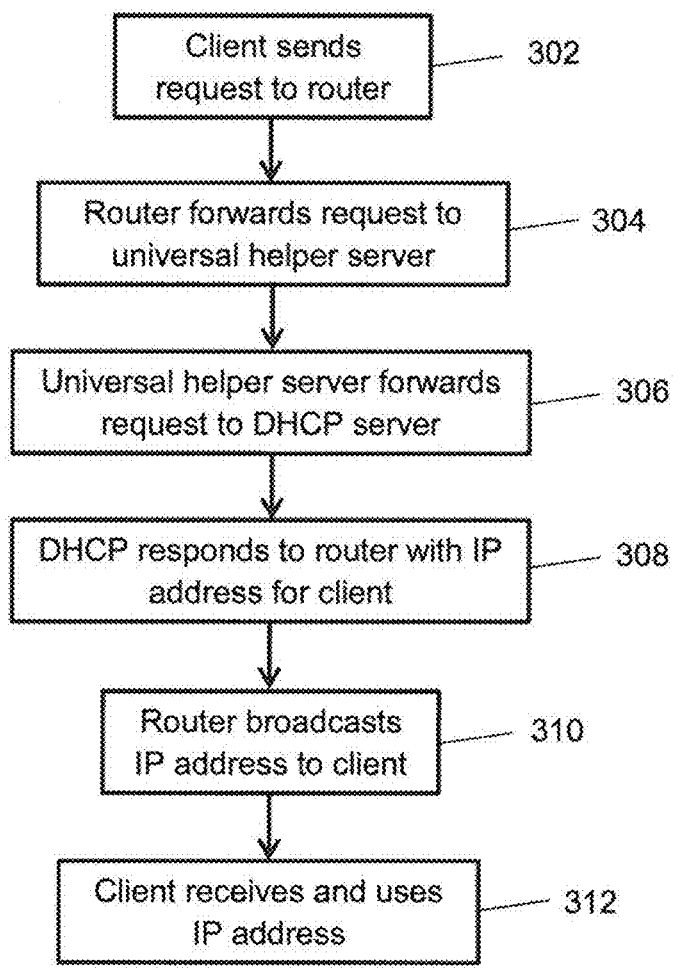
FIG. 3 is a flowchart depicting a method according to some embodiments.

FIG. 3 is a flowchart depicting a method according to some embodiments. The method depicted in reference to FIG. 3 may be implemented by, for example, the system presented in reference to FIG. 1. The method depicted in reference to FIG. 3 may be implemented by embodiments presented in reference to FIG. 2.

At block 302, a client, e.g., a client computer, broadcasts a request for an IP address, as well as any related network parameters. The request is received by a local router.

At block 304, the router forwards the request to a universal helper server. The forwarding may be done directly, i.e., by sending it to an IP address of a specific single universal helper server (or server pair) stored in the router's persistent memory, or may be done via Anycast, in which multiple universal helper servers snare a same Anycast address, which is stored in the router's persistent memory. In the latter case, the Anycast technique routs to a universal helper server that is closest.

At block 306, the universal helper server that received the request forwards the same to a DHCP server. The universal helper server includes in its persistent memory a table of IP addresses of DHCP servers. As described above in reference to FIG. 1, the universal helper server (as well as other universal helper servers on the network) may be configured to pull the current set of DHCP server IP addresses from a central database. In either case, the universal helper server forwards the request to the appropriate DHCP server.

At block 308, the contacted DHCP server responds to the router identified in the request (e.g., by a GIADDR) with a new IP address for the client computer, as well as any additional network parameters.

At block 310, the router receives the response, and broadcasts the reply to be received by the requesting client computer.

At block 312, the client computer receives the response and implements the network parameters, including the new IP address. Note that from the client's perspective, the client is unaware that a universal helper server was involved at all.

Embodiments can include advantages over prior art techniques for implementing DHCP. For example, some embodiments described herein include that each of a plurality of universal helper servers pulls address information for DHCP servers from a central database (e.g., in FIG. 1, universal helper servers 106A, 106B pull such information from central database 110). In such embodiments, system administrators do not have to individually configure routers with unique DHCP address information Instead, systems administrators may configure routers with the same universal helper server IP address (or pair of addresses) and ensure that the individual DHCP server address information in the central database is up to date and correct. Having a single point of failure in the central database reduces time, effort, and the possibility of human error that can result from individually configuring routers with respective DHCP server addresses as is done in the prior art.

Note that, in many implementations, a single pair of universal helper servers is sufficient for a large enterprise system. In particular, DHCP broadcast traffic is typically the smallest portion of DHCP traffic because it is for the initial negotiation for an IP address. After that, DHCP traffic is Unicast point-to-point traffic between the DHCP client and the DHCP server that leased out the IP address.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM) EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing an internet protocol (IP) address to a client device communicatively coupled to a network, the method comprising:

broadcasting, by the client and over the network, a request for an IP address;

receiving, by a router, the request;

forwarding, by the router, the request to a server, wherein the router is not configured with an IP address of a DHCP server;

receiving, by the server, the request;

determining, by the server, an IP address of a DHCP server, wherein the server is configured to pull a plurality of IP addresses of DHCP servers from a table in a database;

forwarding, by the server, the request to the DHCP server;

providing to the router, by the DHCP server, a client IP address; and sending, from the router to the client, the client IP address, whereby the client is configured with the client IP address such that the client can receive point to point messages.

2. The method of claim 1, wherein the determining is based on an IP address of the router.

3. The method of claim 1, wherein the server is configured to periodically pull a plurality of IP addresses of DHCP servers from a table in the database.

4. The method of claim 1, wherein the router is configured with an IP address of the server.

5. The method of claim 1, wherein the sending, by the client, the request comprises broadcasting the request.

6. The method of claim 1, wherein the sending, from the router to the client, the client IP address comprises broadcasting the IP address.

7. The method of claim 1, wherein the forwarding, by the router, the request to the server comprises sending using an Anycast technique.

8. The method of claim 7, wherein the server is one of a plurality of servers sharing an Anycast IP address.

9. A system for providing an internet protocol (IP) address to a client device communicatively coupled to a network, the system comprising:

at least one server communicatively coupled to the network, wherein the at least one server is configured to pull a plurality of IP addresses of DHCP servers from a table in a database; and at least one router communicatively coupled to the network, wherein the router is not configured with an IP address of a DHCP server;

wherein the router is configured to receive a broadcast client request for a client IP address over the network and forward the request to the server;

wherein the server is configured to receive the request, determine an IP address of a DHCP server by obtaining the IP address of the DHCP server from a persistent memory, and forward the request to the DHCP server; and wherein the router is further configured to receive the client IP address from the DHCP server and send the client IP address to the client, whereby the client is configured with the client IP address such that the client can receive point to point messages.

10. The system of claim 9, wherein the server is configured to determine an IP address of a DHCP server based on an IP address of the router.

11. The system of claim 9, wherein the server is further configured to periodically pull a plurality of IP addresses of DHCP servers from a table in the database.

12. The system of claim 9, wherein the router is configured to store an IP address of the server.

13. The system of claim 9, wherein the client is further configured to receive a client request for an IP address broadcast over the network.

14. The system of claim 9, wherein the router is further configured to send the client IP address to the client by broadcast.

15. The system of claim 9, wherein the router is further configured to forward the request to the server using an Anycast technique.

16. The system of claim 15, wherein the server is one of a plurality of servers sharing an Anycast IP address.

* * * * *